(12) United States Patent
Baker

(10) Patent No.: US 7,450,083 B1
(45) Date of Patent: Nov. 11, 2008

(54) SELF-CONTAINED TRACKING UNIT

(76) Inventor: David A. Baker, 4251 S. Natches Ct., Unit C, Englewood, CO (US) 80110

( * ) Notice: Subject to any disclaimer, the term of this patent is extended or adjusted under 35 U.S.C. 154(b) by 268 days.

(21) Appl. No.: 11/327,007

(22) Filed: Jan. 6, 2006

Related U.S. Application Data

(60) Provisional application No. 60/642,031, filed on Jan. 7, 2005.

(51) Int. Cl.
  *H01Q 1/40* (2006.01)
  *H01Q 1/36* (2006.01)
(52) U.S. Cl. ........................ 343/873; 343/895
(58) Field of Classification Search ............... 343/702, 343/872, 878, 895, 709, 873
See application file for complete search history.

(56) References Cited

U.S. PATENT DOCUMENTS

| | | | | |
|---|---|---|---|---|
| 6,064,285 | A  * | 5/2000 | Harron et al. | 333/202 |
| 6,339,397 | B1 * | 1/2002 | Baker | 342/357.07 |
| 6,856,291 | B2 * | 2/2005 | Mickle et al. | 343/701 |

* cited by examiner

*Primary Examiner*—Shih-Chao Chen

(57) ABSTRACT

A self-contained tracking unit includes an elongated housing with a hollow interior cavity housing a GPS receiver, a microprocessor and a transmitter. The housing is mounted between a pair of projecting ribs on a sidewall of the container and has a depth less than the distance of the projecting ribs. An antenna is mounted within the housing, on the forward wall, and an antenna ground plane connected to the antenna is mounted in the housing parallel to the antenna and on the rearward wall of the housing.

9 Claims, 4 Drawing Sheets

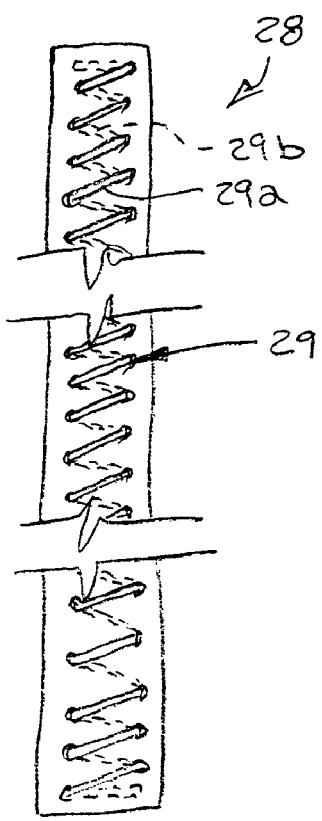
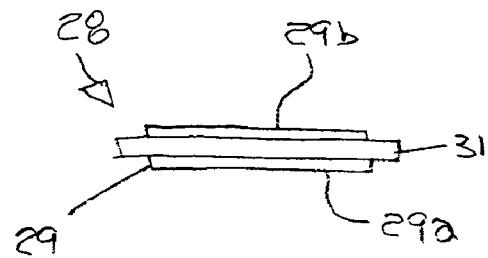
FIG. 6
FIG. 5

SELF-CONTAINED TRACKING UNIT

CROSS-REFERENCES TO RELATED APPLICATIONS

This application claims the benefit of U.S. Provisional Application Ser. No. 60/642,031 filed Jan. 7, 2005.

STATEMENT AS TO RIGHTS TO INVENTIONS MADE UNDER FEDERALLY SPONSORED RESEARCH AND DEVELOPMENT (Not Applicable)

INCORPORATION-BY-REFERENCE OF MATERIAL SUBMITTED ON A COMPACT DISC (Not applicable)

BACKGROUND OF THE INVENTION (1) Field of the Invention

The present invention relates generally to portable, self-contained vehicle tracking and monitoring systems, and more particularly to an improved housing configuration and antenna arrangement.

(2) Description of Related Art Including Information Disclosed Under 37 CFR 1.97, 1.98

There are many problems and challenges for inventors to create a viable container tracking device. Attempts have been made but no one has created a device to solve all of the problems.

The first problem that must be addressed is that the device must operate anywhere around the world. This requires that low earth orbit (LEO) satellite systems be used to communicate the signals back to the central database. Cellular communications, geostationary satellites, and short range radio frequency (RF)—all of which are currently used in the prior art—are therefore not viable solutions to this problem.

Second, the device must be self-powered and work indefinitely because a container travels around the world, is hard to get back, and has no power source. The prior art solutions to this problem are the use of long life (3-5 years) lithium batteries. While such batteries are effective during their life, they must eventually be replaced—which is not always possible. The inventor herein has designed a power system—set forth in co-pending patent application Ser. No. 10/965,423 entitled "Telemetry Power System" and incorporated herein by reference thereto—which consists of a solar panel that charges capacitors, to provide constant power indefinitely.

The tracking unit must be rugged and physically last a long time. Containers are shipped by ship, rail, and trucks. They are handled by cranes, fork-lifts, and other heavy mechanical lifting devices. In addition, containers are constantly exposed to the elements, including salt spray.

BRIEF SUMMARY OF THE INVENTION

It is therefore a general object of the present invention to provide an improved self-contained tracking unit for a shipping container.

A further object is to provide a self-contained tracking unit that is easily mounted on a common shipping container, and will not project beyond the reinforcement ribs of the container.

Yet another object of the present invention is to provide a self-contained tracking unit for a shipping container that has an integrated antenna designed for this specific environment.

These and other objects will be apparent to those skilled in the art.

The self-contained tracking unit of the present invention includes an elongated housing with a hollow interior cavity housing a GPS receiver, a microprocessor and a transmitter. The GPS receiver will receive tracking data and the microprocessor will process the tracking data into a data packet. The transmitter transmits the data packet to a remote receiving station, for transmission to a central database. The housing is mounted between a pair of projecting ribs on a sidewall of the container, and has a depth less than the distance of the projecting ribs. An antenna is mounted within the housing, on the forward wall, and extends generally vertically therein. An antenna ground plane connected to the antenna is mounted in the housing parallel to the antenna and on the rearward wall of the housing.

BRIEF DESCRIPTION OF THE SEVERAL VIEWS OF THE DRAWING

The preferred embodiment of the invention is illustrated in the accompanying drawings, in which similar or corresponding parts are identified with the same reference numeral throughout the several views, and in which:

FIG. 5 is a front elevational view of the antenna; and

FIG. 6 is a top elevational view of the antenna.

DETAILED DESCRIPTION OF THE INVENTION

Figure 1:
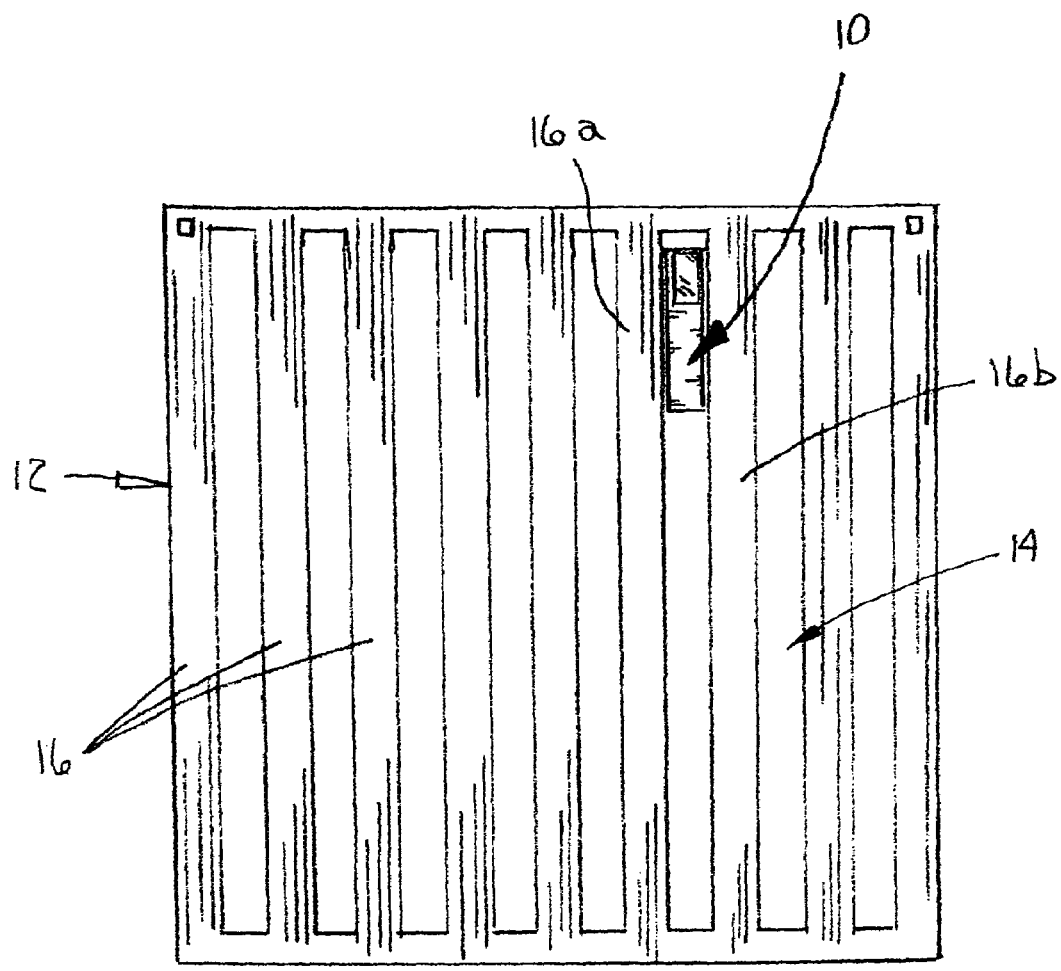
FIG. 1 is an elevational view of the front of a shipping container with the improved tracking unit of the present invention installed between a pair of end ribs.

Referring now to the drawings, and more particularly to FIG. 1, the tracking unit of the present invention is designated generally at 10, and is shown attached to a conventional shipping container 12.

The exterior wall 14 of container 12 is typically formed of sheet steel with ribs 16 formed around at least the vertical walls, for strength. These structural ribs 16 are typically spaced at least about 5 inches apart, and project outwardly at least about 1.75 inches. As shown in FIG. 1, ribs 16 are arranged vertically; with tracking unit 10 mounted between a pair of ribs 16a and 16b, proximal the upper end of the container 12.

Figure 2:
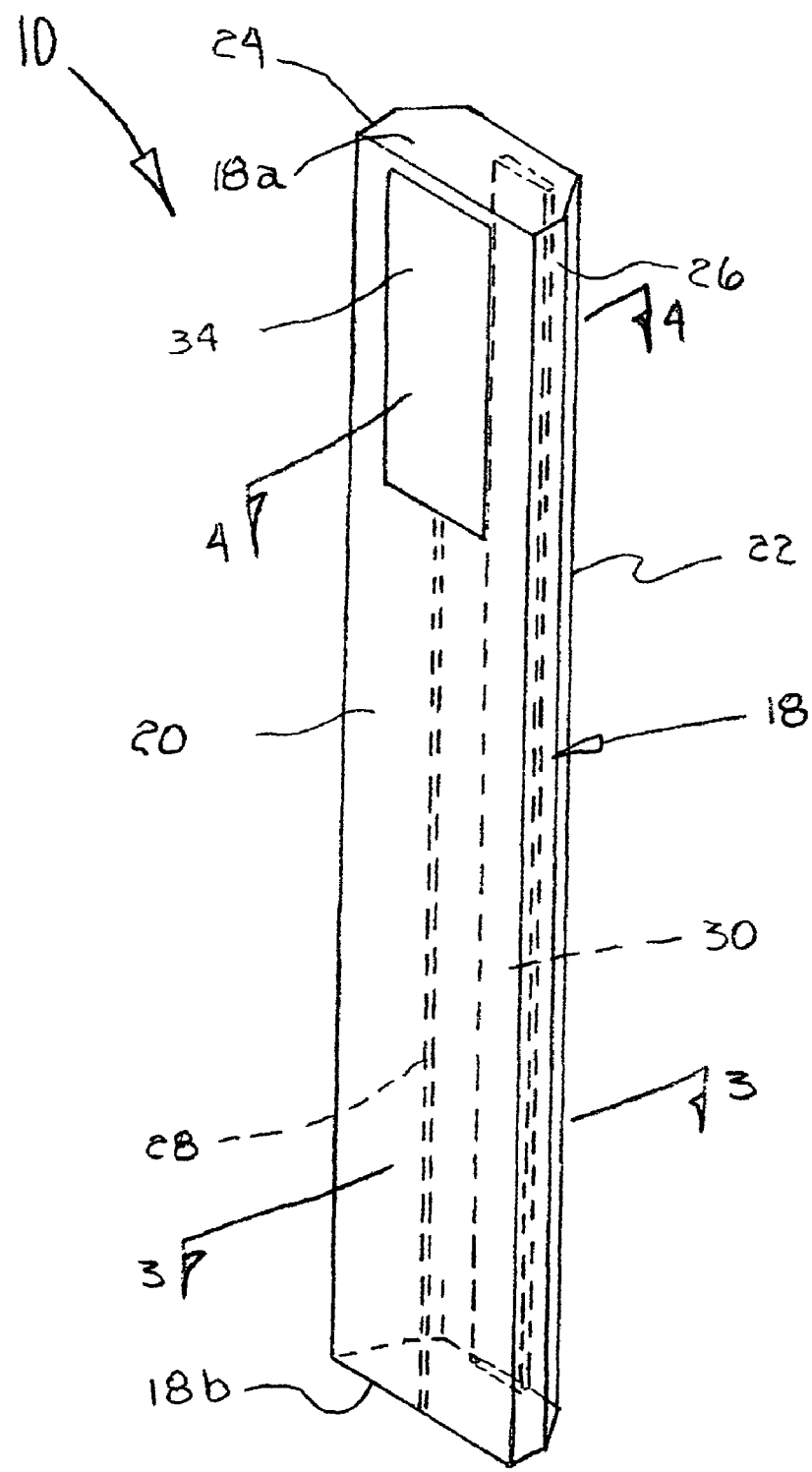
FIG. 2 is a perspective view of the tracking unit.
Figure 3:
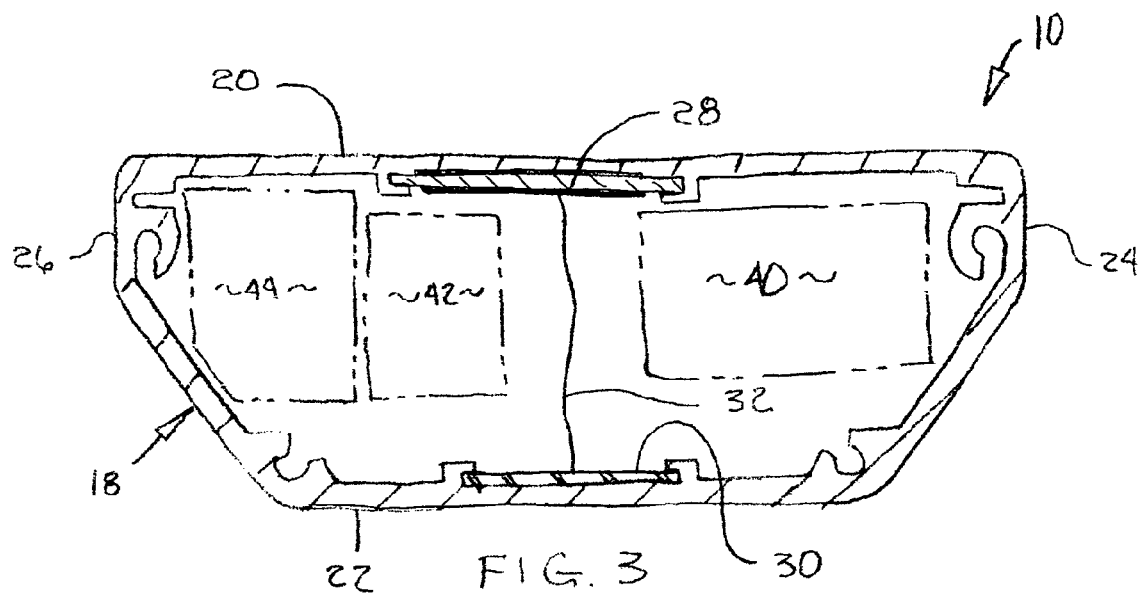
FIG. 3 is a cross-sectional view through the tracking unit, taken at lines 3-3 in FIG. 2.

Referring now to FIGS. 2 and 3, tracking unit 10 includes an elongated hollow housing 18 formed of high impact ABS plastic that is tough and invisible to RF transmissions. Housing 10 is shaped to fit between the ribs 16 of container 12, so that when container 12 is handled, unit 10 will be protected from impacts with other containers and/or lifting equipment by ribs 16 of the container. Thus, the exterior depth of the tracking unit housing 18 (as measured between forward wall 20 and rearward wall 22) is less than about 1.75 inches and the exterior width of housing 18 (as measured between sidewall 24 and sidewall 26) is less than about 5 inches. These dimensions, as well as the fact that the unit 10 will be mounted against a steel wall, create a challenge for the antenna design.

As shown in FIGS. 3, 5 and 6, antenna 28 is a low profile antenna that is integrated into housing 18 along the interior of forward wall 20. In order to achieve a great length of antenna within a confined enclosure, antenna 28 is preferably formed of a helical metal coil 29 which is flattened along a longitudinal axis and formed on a circuit board 31 with a forward half of coil 29 forming traces 29a on one side of the board 31, and a rearward half forming traces 29b located on the opposing side of board 31. A conductor 32, as shown in FIG. 3, electrically connects antenna 28 to an antenna ground plane 30. Antenna ground plane 30 is a flat strip of metal extending along the entire length of the interior face of rearward wall 22. Ground plane 30 is preferably about 1 inch wide, parallel to antenna 28 and aligned generally centrally along rearward wall 24, to increase the efficiency of antenna 28. Antenna 28 extends from the lower edge of the solar panel 34 (described in more detail below) to the lower edge of housing 18, and is enclosed entirely within housing 18.

Figure 4:
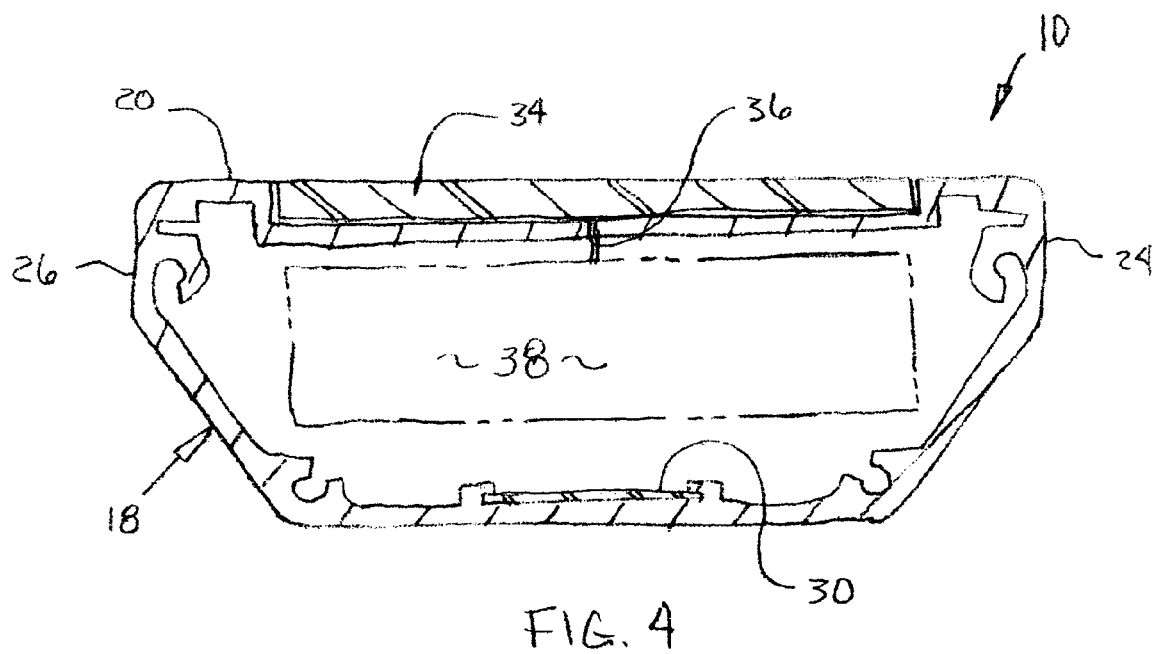
FIG. 4 is a cross-sectional view through the tracking unit, taken at lines 4-4 in FIG. 2.

Referring now to FIGS. 2 and 4, a solar panel 34 is mounted on the upper end of the forward wall 20 of housing 18. Solar panel 34 is shown installed on the outer surface of housing 18. However, it may also be installed within the interior of housing 18, with the panel adjacent a "window" or the like in forward wall 20. As noted above, the inventor herein has designed a power system—set forth in co-pending patent application Ser. No. 10/965,423 entitled "Telemetry Power System"—which consists of a solar panel that charges capacitors, to provide constant power indefinitely. Such a power system is designated generally at 38 in FIG. 4, with a conductor 36 electrically connecting solar panel 34 to the power system 38.

Referring once again to FIG. 3, antenna 28 is connected to several other components of tracking unit 10. More particularly, unit 10 includes a GPS receiver 40, a microprocessor 42 and a transmitter 44. The GPS receiver 40 will receive tracking data and the microprocessor 42 will process the tracking data into a data packet. The transmitter 44 transmits the data packet to a remote receiving station, for transmission to a central database.

The height, width and depth of the tracking unit 10 can vary, depending upon the particular parameters of the shipping container to which it is attached. However, in the situation described above, with ribs 16 spaced about 5 inches apart and projecting outwardly about 1.75 inches, housing 18 would have an overall length of just over 24 inches. The antenna 28 has a length of about 18 inches, and the solar panel has a length of about 6⅜ inches. The antenna 28 is tuned to operate in the close proximity of the container wall.

As discussed above, housing 18 is designed to fit between two vertical ribs 16 of a shipping container 12 so that no component protrudes beyond the shipping container boundaries. The transmitter 42 is a satellite communications module. In use, tracking data is periodically transmitted via the transmitter to a satellite service provider, thence over the Internet to the database of a central server computer. The central server computer will decode the information and provide an interface and value added products such as maps and reports for customers via a web page on the Internet.

Whereas the invention has been shown and described in connection with the preferred embodiments thereof, many modifications, substitutions and additions may be made which are within the intended broad scope of the appended claims.

What is claimed is:

1. A self-contained tracking unit for use on a shipping container, comprising:
    an elongated hollow housing having forward and rearward walls, opposing sidewalls and upper and lower ends, said housing formed of material invisible to RF transmissions;
    a GPS receiver within the housing;
    a microprocessor within the housing and connected to the GPS receiver;
    a transmitter within the housing and connected to the microprocessor;
    a power system within the housing and connected to the GPS receiver, microprocessor and transmitter;
    an antenna mounted on the interior surface of the forward wall within the housing and extending vertically and generally centrally between the sidewalls;
    said antenna including a helical coil flattened along a longitudinal axis and formed on a circuit board with a forward half of the coil forming traces on one side of the board and a rearward half forming traces on the opposing side of the board; and
    an antenna ground plane mounted on the interior face of the rearward wall and extending vertically, parallel to the antenna, and connected to the antenna.

2. The tracking unit of claim 1, wherein said antenna ground plane is a flat metal strip having a rectangular cross-section.

3. The tracking unit of claim 1, wherein said power system includes a solar panel mounted on the forward wall of the housing.

4. In combination:
    a shipping container having vertical walls of steel, with at least one wall having at least a pair of parallel vertical ribs formed therein and spaced apart a distance W, said ribs projecting outwardly a distance H; and
    a self-contained tracking unit mounted on said container, comprising:
        an elongated hollow housing having opposing, flat and parallel forward and rearward walls, opposing sidewalls, and upper and lower ends, said housing formed of material invisible to RF transmissions;
        said housing mounted between said pair of ribs and having a depth, as measured between exterior surfaces of the forward and rearward walls, less than the distance H of the ribs, such that the forward wall does not project beyond the ribs;
        a GPS receiver within the housing;
        a microprocessor within the housing and connected to the GPS receiver;
        a transmitter within the housing and connected to the microprocessor;
        a power system within the housing and connected to the GPS receiver, microprocessor and transmitter; and
        an antenna mounted within the housing and connected to the transmitter;
        said antenna including a helical coil flattened along a longitudinal axis and formed on a circuit board with a forward half of the coil forming traces on one side of the board and a rearward half forming traces on the opposing side of the board.

5. The combination of claim 4, wherein said antenna is mounted on an interior surface of the forward wall within the housing and extends vertically and generally centrally between the sidewalls.

6. The combination of claim 5, further comprising an antenna ground plane mounted on the interior face of the rearward wall and extending vertically, parallel to the antenna, and connected to the antenna.

7. The combination of claim 6, wherein said antenna ground plane is a flat metal strip having a rectangular cross-section.

8. The combination of claim 7, wherein said power system includes a solar panel mounted on the forward wall of the housing.

9. The combination of claim 8, wherein said antenna extends from a lower end of the solar panel to a lower end of the housing.

* * * * *